United States Patent [19]

Symes

[11] Patent Number: 4,825,975
[45] Date of Patent: May 2, 1989

[54] CLAMPING DEVICE & MECHANICS STAND FOR ATTACHING TO BUMPER OF MOTOR VEHICLE

[76] Inventor: Gregg Symes, 3577 S. Sunrise Rd., West Valley City, Utah 84119

[21] Appl. No.: 208,066

[22] Filed: Jun. 17, 1988

[51] Int. Cl.$^4$ ............................................. B60R 3/00
[52] U.S. Cl. .................................... 182/92; 182/159; 182/150; 24/68 CD; 24/71.2; 280/163
[58] Field of Search ................ 182/150, 92, 206, 131, 182/159; 280/163; 24/68 CD, 71.2

[56] References Cited

U.S. PATENT DOCUMENTS

| | | | |
|---|---|---|---|
| 1,657,190 | 1/1928 | Ballou | 24/71.2 |
| 2,195,366 | 3/1940 | Haigh . | |
| 2,526,216 | 10/1950 | Gartner | 24/71.2 |
| 2,848,150 | 8/1958 | Taus | 182/150 |
| 2,973,052 | 2/1961 | Miller | 182/150 |
| 3,865,431 | 2/1975 | Zakhl . | |
| 3,921,539 | 11/1975 | Berger . | |
| 4,017,093 | 4/1977 | Stecker | 280/163 |
| 4,045,002 | 8/1977 | Miller | 24/68 CD |
| 4,057,125 | 11/1977 | Kroft . | |
| 4,089,276 | 5/1978 | Enos . | |
| 4,605,098 | 8/1986 | Leuty | 280/163 |
| 4,753,447 | 6/1988 | Hall | 182/92 |

Primary Examiner—Reinaldo P. Machado
Attorney, Agent, or Firm—Thorpe North & Western

[57] ABSTRACT

Apparatus for attaching to a bumper of a motor vehicle comprises a pair of clamp members which can be releasably secured to the bumper; a pair of stanchions, with each stanchion being attached to a respective clamp member to extend in a substantially vertical position adjacent to the front of a bumper on which the clamp members are engaged; and a generally rectangular base platform whose length is such that the base platform can be positioned substantially horizontally between the stanchions, with attachment means being provided at each of the opposite, longitudinal ends of the base platform for releasably attaching the base platform to the respective stanchions at selectable positions along the lengths of the respective stanchions.

20 Claims, 3 Drawing Sheets

CLAMPING DEVICE & MECHANICS STAND FOR ATTACHING TO BUMPER OF MOTOR VEHICLE

BACKGROUND OF THE INVENTION

1. Field of the Invention

The present invention relates generally to apparatus which is removably attached to the bumper of a motor vehicle for supporting an item such as a mechanics stand on the bumper. In particular, the invention relates to a step or work platform which is readily attached to the front bumper of a motor vehicle to aid a mechanic in working on the engine of the vehicle.

2. State of the Art

It is common to mount various items to the bumper of an automotive vehicle. Such items as steps and seats have been mounted on a bumper of a vehicle by using various hooking and clamping mechanisms. The hooking mechanisms rely upon a hook member which engages the top, rear edge of the bumper. Clamping mechanisms generally comprise spaced clamp members which are adapted to engage the top and bottom, respectively, of the bumper, with some type of means, such as a threaded drive rod, for forcing the clamp members into engagement with the bumper.

Although such items as seats and steps have been attached to bumpers of vehicles, there has been no suggestion of a system wherein an adjustable platform is provided which can be used as a step, a seat or a bench. Such a system, when easily installed on and removed from a bumper of a vehicle, would be highly desirable for individual use as well as for commercial mechanics when working on the engine of the vehicle. In many vehicles used today, especially trucks and off road vehicles, the engine compartment is located behind high, rather broad, fenders on the vehicle and it is difficult to reach into the engine compartment either over the fenders of the vehicle or over the radiator compartment at the front of the vehicle. An easily used step or seat which is mounted at the front of the vehicle would allow much easier mode of access to the motor compartment.

3. Objectives

A principal objective of the present invention is to provide a novel clamping device which is quickly and easily mounted on and removed from a bumper of a motor vehicle.

A particular objective of the present invention is to provide such a novel clamping device which incorporates a continuous length of flexible band, such as a rope or strap, wherein the band has spaced hook means thereon for attaching to the opposite top and bottom edges of a bumper or of extending about the bumper and attaching to each other, and further wherein the intermediate portion of the band can be wrapped about a take-up device, such as a shaft driven by a rachet, to tighten the band about the bumper.

Another objective of the invention is to provide such a novel clamping device for attaching to the bumper of a motor vehicle, wherein the device further includes a bracket and a stanchion which can be attached at various positions along its length to the bracket, with the stanchion being adapted to support various other items, such as a floodlight, a platform for tools, etc.

A still further objective of the present invention is to provide apparatus which is quickly and easily attached to the bumper of a motor vehicle comprising a pair of novel clamping devices for attaching to the bumper, a pair of stanchions to be attached to the clamping devices, and a platform which is supported between the stanchions and can be used as a step, seat or shelf by a person who is working on the vehicle.

BRIEF DESCRIPTION OF THE INVENTION

The above objectives are achieved in accordance with the present invention by providing novel clamping devices which can further be incorporated with upright stanchions and a platform means to form a step, seat or shelf which is quickly and easily attached to a bumper of a vehicle. A person can use the apparatus as a step at the front of the vehicle to allow the person to reach into the engine compartment of the vehicle. Alternatively, the apparatus can be used as a seat to support a person as work is being done in the engine compartment, or the apparatus can be used as a shelf for holding tools and parts.

The novel clamping device in accordance with the invention comprises a housing, a shaft extending through the housing, an elongate band attached at one end to the shaft, a ratchet associated with the shaft, and means for turning the shaft. The elongate band is attached at its first end to the shaft such that when the shaft is rotated, the band wraps about the shaft. The term "band" is used throughout the specification and claims to denote generically a flexible, elongate member whether it be in the form of a strap, belt, ribbon, rope or similar item. In a preferred embodiment, the band comprises fabric webbing similar to that used in seat belts.

The band extends from the shaft within the housing through a first opening in the upper portion of the housing to form a loop, with the looped back portion of the band extending back through the first opening and then downwardly through the housing so that the second end of the band extends out a second opening in the housing.

A first hook member is attached to the band for sliding movement along the band, with the first hook member being positioned within the loop extending from the first opening of the housing. A second hook member is attached to the second end of the band.

The clamping device is attached to a bumper by positioning the housing adjacent to the front side of the bumper. The first hook member is then attached to the upper side edge of the bumper, and the second hook member is attached to the lower side edge of the bumper. The shaft in the housing is rotated so as to wrap the band about the shaft and tighten the two hook members against the bumper to firmly secure the housing against the front side of the bumper. In those situations where the bumper does not have upper and lower side edges which can be engaged by the hook members, the first and second hook members can be wrapped around the opposite side edges of the bumper and attached to each other adjacent to the back side of the bumper.

The clamping device is further preferably provided, on one of the sides of the housing, with a bracket means which is adapted to accept an elongate stanchion. The stanchion is attachable to the bracket to extend in a substantially vertical position adjacent to the front end of the bumper to which the clamping device is engaged.

An especially preferred embodiment of apparatus of the invention which is adapted to be used as a step, seat or shelf comprises a pair of clamping devices and associated stanchions. A generally rectangular base platform has attachment means provided at each of its longitudinal ends, and the attachment means are adapted to be releasably attached to respective stanchions of the pair of clamping devices after the clamping devices have been attached to a bumper of a vehicle. The base platform can be adjusted to any position along the length of the stanchions so as to act as a step upon which one can better reach the engine compartment of the vehicle or a shelf upon which tools or parts can be supported while one works on components within the engine compartment.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 1:
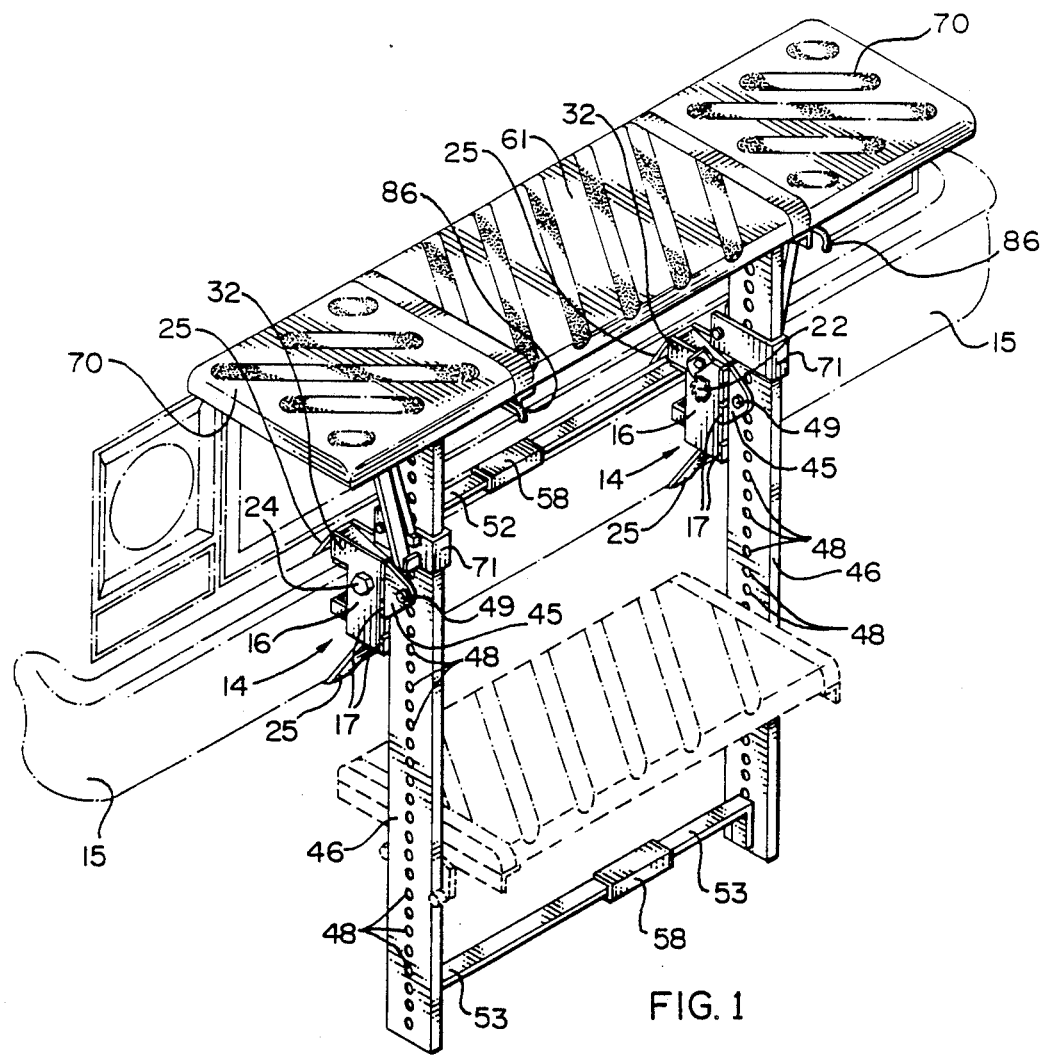
FIG. 1 is a pictorial representation of combination apparatus in accordance with the present invention taking the form of a step, seat or bench which is readily attached to the bumper of a motor vehicle.

Referring now in particular to FIGS. 1, 2, 10 and 11, there is illustrated a particularly preferred embodiment of a clamping device 14 in accordance with the invention for being releasably attached to a bumper 15 of a motor vehicle. The clamping device 14 comprises a housing 16 formed from two side plates which are spaced from each other by a relatively small distance between about 1 and 3 inches by forward and rearward sides 17 and 18 respectively, as best shown in FIG. 16.

The two side plates of the clamping device 14 comprise the dominant portion of the housing 16, and the lead lines from the numerals 16 have been made to terminate on the side plates so that the reference numerals 16 at to identify both the side plates in particular and the housing in general.

Figure 2:
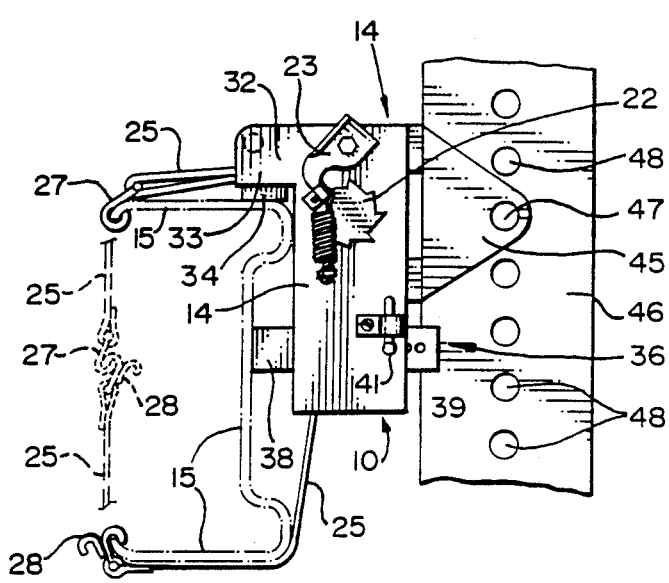
FIG. 2 is a vertical cross section through the bumper of the vehicle on which the apparatus of FIG. 1 is attached, showing a side elevation of the clamping device used to attach apparatus to the bumper.

A shaft 20 (FIG. 10) extends through the housing 16 and preferably through openings in the opposite side plates such that the shaft 20 and the openings in the side plates form a journal bearing for rotational movement of the shaft 20 about its longitudinal axis. A ratchet is associated with the shaft 20. As best shown in FIG. 2, the ratchet comprises a toothed rachet element 22 and a spring biased pawl 23. The ratchet element 22 is attached securely to one end of the shaft 20 extending from one side plate of the housing 16. In conventional manner, the pawl 23 allows the ratchet element 22 and the shaft 20 to rotate essentially freely in one direction, while holding the ratchet element 22 and shaft 20 from rotation in the opposite direction unless the pawl 23 has been released from the ratchet element 22.

A means of turning the shaft 20 and its associated ratchet element 22 is provided. As shown in FIG. 1, a preferred means is shown comprising a bolt head 24 formed at the end of the shaft opposite the ratchet element. The bolt head 24 can be engaged with wrench to turn the bolt head 24 and shaft 20. As can be seen from the drawings, the ratchet element 22 is positioned at the opposite end of the shaft 20 from the bolt head 24, with the ratchet element 22 and the bolt head 24 being positioned adjacent to the respective outside surfaces of the side plates of the housing 16.

Figure 10:
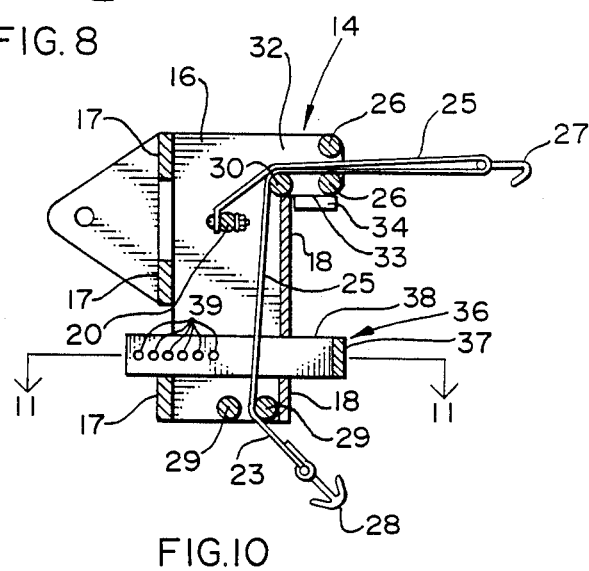
FIG. 10 is a cross section through one of the clamping devices used in clamping the apparatus of FIG. 1 to the bumper.

The clamping device further includes an elongate band 25 which as best shown in FIG. 10 has its first end connected to the shaft 20 in a manner that the band 25 will wrap about the shaft 20 when the shaft is rotated. The band 25 extends from the shaft 20 through an opening in the upper portion of the housing 16 to form a loop around a first hook member 27 which is attached to the band 25 for sliding movement along the band 25 in the loop formed by the band 25. The opening in the upper portion of the housing 16 is advantageously formed by two space bars 26 (FIG. 10) extending between the side plates of the housing 16. The band 25 from the loop extends back through the opening in the upper portion of the housing 16 and then downwardly through the housing 16 so that the second end of the band 25 extends out a second opening in the housing 16. A second hook member 28 is attached to the second end of the band 25. The second opening in the upper portion of the housing 16 is advantageously formed by two space bars 29 (FIG. 10) extending between the side plates of the housing 16.

As best shown in FIG. 2, the first and second hook members 27 and 28 are adapted to be attached to opposite side edges of a bumper 15. As the first end of the band 25 is wrapped about the shaft 20, the band 25 tightens and engages both hooks firmly to the edges of the bumper. As the shaft 20 is rotated, adequate tension is developed in the band 25 to securely hold the clamping device 14 to the bumper 15. The ratchet means associated with the shaft 20 holds the tension in the band 25 until it is desired to release the clamping device 14 from the bumper 15. In releasing the illustrated embodiment of the clamping device 14 from the bumper 15, the pawl 23 is be released from engagement with the ratchet element 22, whereby the tension in the band 25 is released, and the shaft 20 can be rotated to unwrap the band 25 therefrom.

In some applications, it may be difficult to attach the two hook members 27 and 28 to the edges of the bumper 15. In such cases, the loop in the band 25 is wrapped about the upper edge of the bumper, and the second end of the band 25 is wrapped about the lower edge of the bumper such that the hooks meet each other at the back side of the bumper as shown in phantom in FIG. 2. In this latter application, the hooks 27 and 28 engage each other, and when the first end of the band 25 is wrapped on the shaft 20, tension again is developed in the band 25 to firmly secure the clamping device 22 to the bumper 15. As shown in the drawings, one of the hook members 27 and 28 can have a single gang, with the other hook member having a double gang. As illustrated, the hook member 27 attached to the loop has the single gang, while the hook member 28 attached to the second end of the band 25 has the double gang. The double gang on the one hook permits it to be attached to the single gang hook without twisting the band 25. The double gang on one of the hook members is, however, only a preferred embodiment. The double gang on one of the hooks is not, per se, required. Both hook members 27 and 28 could just as well each have only a single gang.

In the preferred embodiment of the clamping device 14 as illustrated, each of the side plates of the housing 16 has an upper projection which extends outwardly toward the bumper 15 so as to form a ledge 33 which is adapted to rest on the upper side of the bumper 15. A contact pad 34, see FIGS. 2 and 10, is advantageously provided on the ledge 33 to provide a firm support for the bumper 15. As shown in FIG. 10, it is advantageous to provide a guide bar 30 extending between the side plates of the housing 16, with the guide bar 30 being located adjacent to the inner edge of the ledge 33. The guide bar 30 guides the band 25 from the shaft 20 to the opening formed by the spaced bars 26. In addition, the guide bar 30 guides the returning portion of the band 25 coming from the loop containing the hook member 27 downwardly to the other opening in the lower portion of the housing 16 which is formed by the spaced bars 29. The spaced bars 28 and 29, as well as the guide bar 30, preferably have cylindrical surfaces to facilitate the sliding of the band 25 thereover.

Inasmuch as many vehicles have bumpers which have a recessed front face, it is preferable to provide the clamping device 14 of the present invention with an adjustable spacer which will allow the clamping device 14 to be positioned in a substantially vertical position adjacent to the front of the bumper 15. The adjustable spacer is located between the ledge 33 and the lower end of the housing 16 and can be adjusted to extend from one side of the housing 16 to the recessed front face of the bumper 15.

Figure 11:
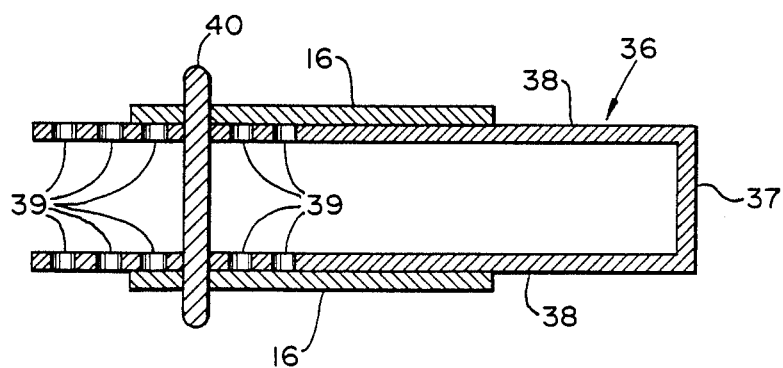
FIG. 11 is a horizontal cross section through the clamping device of FIG. 10 as taken along line 11—11 of that Figure.

As best illustrated in FIGS. 10 and 11, the adjustable spacer comprises a U-shaped, sliding member 36. The base 37 of the U-shaped member 36 has a width of essentially the same dimension as the distance between the side plates of the housing 16. Elongate legs 38 of the U-shaped member 36 extend from the base 37 to slide in closely spaced orientation against the inside surfaces of the spaced side plates of the housing 16. Means are provided for selectively securing the legs 38 at adjustable positions with respect to the housing 16. As illustrated, such means comprises a plurality of spaced openings 39 in the legs 38 of the U-shaped member 36. These openings 39 are adapted to register with aligned openings 41 (one such opening 41 being shown in FIG. 2) in the side plates of the housing 16, and a pin 40 is provided to engage the aligned openings 41 in the housing 16 and the selected openings 39 on the legs 38 of the U-shaped member to position the U-shaped member at selected positions along its length with respect to the housing 16. The U-shaped member 36 is preferably positioned such that the base 37 thereof will contact the face of the bumper 15 as shown in FIG. 2 to hold the clamping device 14 in a substantially vertical orientation.

The clamping device 14 is further preferably provided with a bracket means 45 which extends outwardly from the front side of the clamping device, i.e., from the side of the clamping device most remote from the bumper 15 when the clamping device 14 is attached to a bumper. The bracket 45 is adapted to have an elongate stanchion 46 attached thereto, such that the stanchion will be oriented substantially vertical when the clamping device 14 is attached to a bumper 15.

As illustrated, the bracket 45 comprises a substantially flat lug which extends forwardly from the front side of the clamping device 14 such that a plane through either broad face of the lug is parallel with the broad faces of either of the side plates of the housing 16 of the clamping device. Means are provided for releasably attaching the stanchion 46 to the bracket 45. Such means comprises an opening 47. The stanchion has a plurality of openings 48 spaced along its length. These openings 48 will register with the opening in the bracket 45, and a pin 49 is inserted through the aligned openings as shown in FIG. 1 to secure the stanchion 46 to the bracket 45. As can be seen, the stanchion 46 can be attached to the bracket 45 at any of the openings 48 along the length of the stanchion 46.

As illustrated, the stanchion 46 preferably comprises an elongate, flat, rectangular bar stock whose width is substantially greater than the depth of the bar. Generally, the bar forming the stanchion 46 will have a depth of about $\frac{3}{8}$ to $\frac{5}{8}$ inch, and the width of the bar is between about 1.5 inches and 4 inches. The openings 48 in the stanchion 46 are preferably aligned along the longitudinal centerline of the broad, flat faces of the bar forming the stanchion 46.

Various items can be mounted on the stanchion such as a flood lamp, shelf or seat. In a particularly preferred embodiment of apparatus in accordance with the invention which can be used as a step, seat or shelf to be used when working within the engine compartment of a motor vehicle, a pair of clamping devices 14 and their associated stanchions 46 are combined with one or more platforms which can be used as a step, seat or shelf. In this embodiment, as illustrated in FIGS. 1 and 3-9, the clamping devices are mounted at spaced positions on the bumper 15 of the vehicle, and the stanchions 46 are maintained in vertical, parallel orientation by a pair of rigid extension arms which interconnect the two clamping devices 14 and the respective stanchions 46 to maintain the stanchions 46 in a rigid, parallelogram orientation.

The first extension arm 52 extends between the housing 16 of the first clamping device 14 and the housing 16 of the second clamping device 14. The second extension arm 53 extends between the respective stanchions 46 attached to the pair of clamping devices 14, with the second extension arm 53 being attached to the stanchions 46 at positions adjacent to the lower ends of the respective stanchions 46.

To facilitate storage of the apparatus, such as beneath a seat or in the trunk of a vehicle, each of the opposite ends of the first extension arm 52 is pivotally attached to a mutually respective housing 16 of the clamping devices 14, and each of the opposite ends of the second extension arm 53 is pivotally attached to a mutually respective stanchion 46 of the clamping devices 14. To further aid in the folding of the apparatus into its storage position, each of the first and second extension arms 52 and 53 is provided with a releasable elbow hinge 54 (FIG. 3) positioned intermediate the ends of the respective extension arms 52 and 53.

Figures 3, 4, 5:
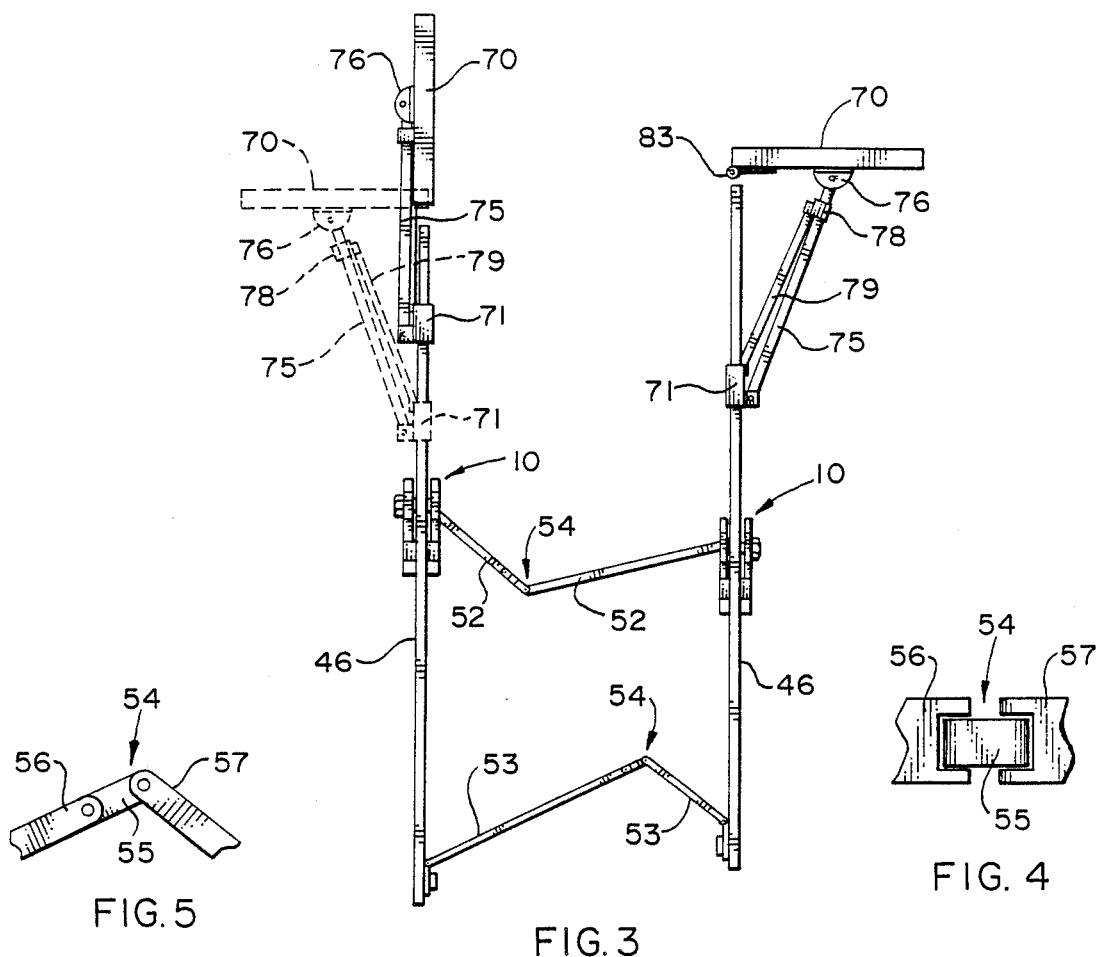
FIG. 3 is a front schematic view of the apparatus of FIG. 1 showing the foldable extension arm in a partially folded condition to illustrate how the apparatus can be folded together for storage, and further showing one of the two extension platforms in a folded condition for storage.
FIG. 4 is a partial top view of the linkage means used in each of the, foldable extension arms.
FIG. 5 is a partial side view of the linkage means used in each of the foldable extension arms, with the linkage means being in a partially folded condition.

The extension arms 53 and 54 fold together in an accordion style such that the stanchion on one of the clamping devices can be brought into close, parallel orientation with respect to the other stanchion. In FIG. 3, the apparatus is shown partly folded into its storage position. As shown in FIGS. 4 and 5, the elbow hinges 54 preferably formed by breaking the extension arms into two pieces 56 and 57, with a link 55 being pivotally mounted at its opposite ends to the otherwise free ends of the pieces 56 and 57. It should be recognized, however, that the otherwise free ends of the pieces 56 and 57 could be pivotally joined directly to each other. Locking means are provided for locking the elbow hinges 54 into a fixed, operative, straight line position. The locking means advantageously comprises a sliding sleeve 58. The sleeves 58 fit coaxially over the respective extension arms 52 and 53, and will slide entirely over the elbow hinge portion of the extension arms to hold the elbow hinges in a locked, straight line orientation.

Figure 8:
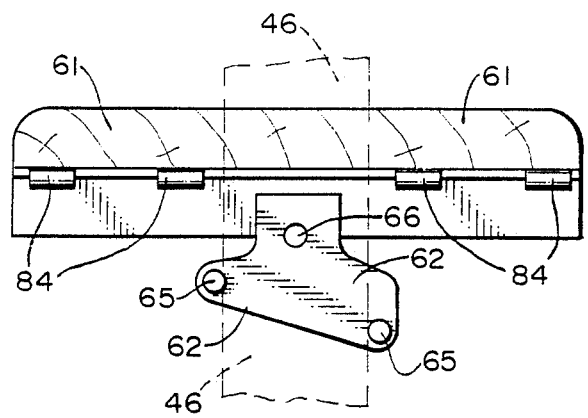
FIG. 8 is an end view of a base platform, showing attachment means for attaching the base platform to the stanchion, with the stanchian being shown in phantom.
Figure 9:
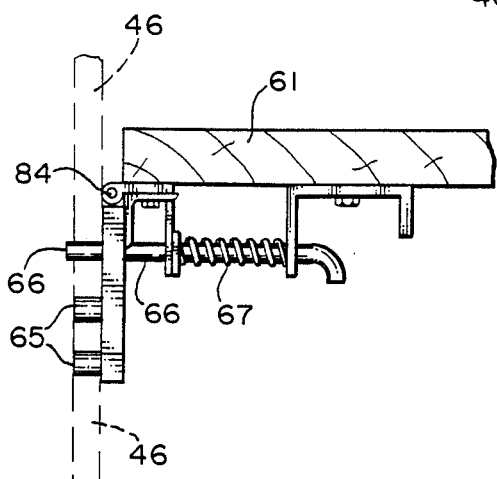
FIG. 9 is a partial, vertical, longitudinal cross section through the base platform of FIG. 8, again showing the stanchion in phantom.

The apparatus as best shown in FIGS. 1, 8 and 9 further includes a generally rectangular base platform 61 whose length is such that the platform 61 can be positioned substantially horizontally between the stanchions 46 of the spaced clamping devices 14. Attachment means are provided at each of the opposite, longitudinal ends of the base platform 61 for releasably attaching the base platform 61 to the respective stanchions 46 at selected positions along the lengths of the respective stanchions 46.

Referring to FIGS. 8 and 9, each end of the base platform 61 is preferably provided with a carriage 62 which is adapted to move laterally along the respective stanchions 46. The carriages 62 are each provided with a lock pin 66 which is adapted to be releasably engaged in the openings 48 in the stanchions 46. Thus, the carriages 62 can be moved up and down along the stanchions 46 to a selected position for the platform 61, with the pins 66 on the carriages 62 engaging the mutually respective openings 48 in the stanchions 46 to lock the platform in the selected position.

As illustrated in FIGS. 1, 8 and 9 the carriage 62 comprises a flat plate which is mounted beneath the side edge of the platform 61. The flat plate is adapted to slide flatwise along the face of the stanchion 46. A pair of cylindrical projections or studs 65 are spaced apart by the width of the flat face of the stanchion and extend outwardly from the carriage 62 to slide along the opposite side edges of the stanchion 46. The studs 65 are preferably displaced from each other in a vertical direction, such that the studs guide the carriage 62 and prevent rotational displacement of the carriage 62 relative to the stanchion 46.

The lock pins 66 preferably include spring biased, elongate pins 66 mounted beneath the platform 61. The pins 66 extend through mutually respective openings in the flat plate comprising the carriage 62, such that the extending ends of the pins 66 can engage the selected openings 48 in the stanchions 46. The spring 67 normally biases the pin 66 into engagement with the opening 48 in the stanchion 46. When the carriage 62 is to be moved, the opposite end of the pin 66 is pulled against the spring bias to disengage the extending end from the opening 48 in the stanchion. The carriage 62 is moved to the desired new position, and the pin 66 is allowed to engage the selected opening 48 in the stanchion 46.

In accordance with the invention, the apparatus as illustrated in FIGS. 1, and 3-7 may further include at least one extension platform 70 which is attached to one of the ends of the base platform 61 and which extends outwardly therefrom in the same plane as the base platform 61. As shown in the drawings, two such extension platforms 70 are included which extend outwardly from the respective, opposite ends of the base platform 61.

Each of the extension platforms 70 is provided with support means which allows the platform 70 to be folded flat against the plane of a respective stanchion 46 for storage when the apparatus is not being used. The stabilizing support means comprises a second carriage 71 which is adapted to move laterally along a respective stanchion 46. Lock means are provided for securing the second carriage 71 in firm engagement with the respective stanchion 46. A support brace extends from the second carriage 71 to the extension platform 70 at a position on the underneath side of the platform 70 which is spaced from the end of the platform 70 which is attached to the base platform 61.

The second carriage 71 preferably comprises a telescopic sliding member which encircles the respective stanchion and is adapted to slide up and down along the length of the respective stanchion 46. The lock means for securing the second carriage 71 in place along the stanchion 46 preferably comprises a cam and lever member 73. As the lever is rotated downwardly and inwardly toward the stanchion 46, the cam portion makes first engagement with the side edge of the stanchion 46 to lock the carriage 71 in place. When the lever is rotated outwardly from the stanchion 46, the cam portion releases its engagement with the side edge of the stanchion 46, and the carriage 71 is free to move up and down along the stanchion 46.

The support bracket for each of the extension platforms 70 comprises an elongate arm 75 which extends from the carriage 71 to the underneath side of the platform 70. The arm 75 is pivotally connected to the carriage 71 at one end, as well as being pivotally connected to the underside of the platform 70 at the other end. The arm 75 can thus fold up against the plane of its mutually respective stanchion 46 as shown in FIG. 3 for storage, and the platform 70 can also be pivoted into a plane which is adjacent to the plane of the stanchion 46.

Figures 6, 7:
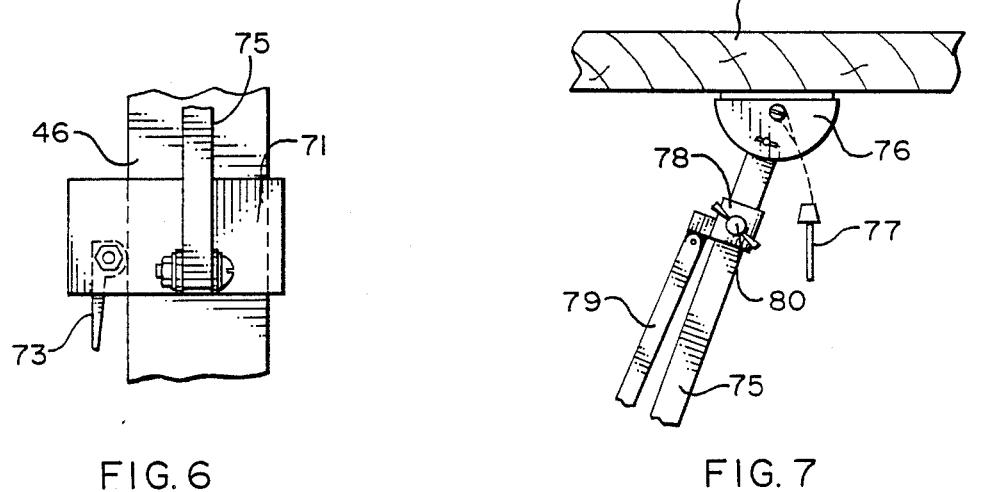
FIG. 6 is a partial side view of the sliding carriage unit used in mounting the extension platforms to the stanchions of the apparatus of FIG. 1.
FIG. 7 is a partial, vertical cross section through one of the extension platforms showing the pivotal connection of support arms to the platform.

Locking means as shown in FIG. 7 are preferably provided for locking the platform in a horizontal position with respect to the arm 75 when the arm 75 is in its extended, working position. The locking means comprises a bracket 76 which extends downwardly from the underneath side of the platform 70 adjacent to the arc of the pivoting arm 75. Corresponding openings are provided in the bracket 76 and the arm 75, and when the openings are in registry, a lock pin 77 is engaged within the openings to prevent further rotation of the platform 70 relative to the arm 75.

Means can also be provided to lock the arm 75 in its proper working position extending from the carriage 71. A slider element 78 is provided to slide along the length of the arm 75, and a supplemental arm 79 is pivotally attached at one end to the slider. The other end of the supplemental arm 79 is pivotally attached to the carriage 71. A thumb screw 80 is provided on the slider element 78. The thumb screw 80 can be tightened down against the arm 75 so as to prevent sliding movement of the slider element therealong and thus lock the arm 75 from further rotation about is pivotal connection to the carriage 71.

As mentioned previously, each extension platform 70 is preferably attached at one of its ends to a mutually respective end of the base platform 61 when in their working positions so as to extend outwardly from the respective end of the base platform 61 in the same plane as the base platform 61. The means for attaching the extension platform 70 to the base platform 61 comprises a pair of spaced, aligned eye members which are adapted to be placed in registry in a fashion similar to a piano hinge. One of the aligned eye members 83 (FIG. 3) is positioned along the edge of the extension platform 70 as shown in FIG. 3, and the other of the aligned eye members 84 (FIGS. 8 and 9) is positioned along the edge of the base platform 61. When the platforms 61 and 70 are aligned end-to-end in their operating position, the eye members 83 align with the eye members 84 and a slide pin 86 can be engaged in the aligned eye members to securely hold the ends of the platforms 61 and 70 together.

Although preferred embodiments of the cleat 22 and track 24 of the present invention have been illustrated and described, it is to be understood that the present disclosure is made by way of example and that various other embodiments are possible without departing from the subject matter coming within the scope of the following claims, which subject matter is regarded as the invention.

What I claim is:

1. A clamping device for being releasably attached to a bumper of a motor vehicle, said clamping device comprising
    a housing;
    a shaft extending through the housing;
    a ratchet associated with said shaft;
    means for turning said shaft;
    an elongate band having first and second ends, with the first end thereof being connected to said shaft such that when said shaft is rotated, the band wraps about said shaft;
    said band extending from said shaft through a first opening in the upper portion of said housing to form a loop with the band then extending back through said first opening and downwardly through said housing so that the second end of said band extends out a second opening in said housing;
    a first hook member attached to said band for sliding movement along said band, with said first hook member being positioned within said loop extending from said first opening in said housing; and
    a second hook member attached to the second end of said band,
    wherein said first and second hook members can be attached to apposite side edges of a bumper or can be wrapped around the opposite side edges of a bumper and attached to each other adjacent to the back side of said bumper, so that as said shaft in said housing is rotated, the band wraps about said shaft and tightens the first and second hook members to firmly secure said housing to the bumper.

2. A clamping device in accordance with claim 1, wherein a ledge is formed in said housing adjacent to the upper end of said housing, with said ledge extending outwardly from one side of said housing so that said ledge can rest against the upper side of a bumper.

3. A clamping device in accordance with claim 2, wherein said housing is provided with an adjustable spacer which is located between said ledge and the lower end of said housing and which can be adjusted to extend from one side of said housing to the front face of the bumper.

4. A clamping device in accordance with claim 1, wherein said shaft extends through openings on opposite sides of said housing, with said openings forming journal bearings for said shaft.

5. A clamping device in accordance with claim 4, wherein said ratchet mechanism is positioned at one end of said shaft and adjacent to one of the sides of said housing.

6. A clamping device in accordance with claim 4, wherein the means for turning said shaft comprises a bolt head formed at one of the ends of said shaft, such that the bolt head can be engaged with a wrench to turn the bolt head and shaft.

7. A clamping device in accordance with claim 6, wherein said ratchet mechanism is positioned at an opposite end of said shaft from said bolt head, with the ratchet mechanism further being adjacent to one of the sides of said housing.

8. A clamping device in accordance with claim 1, further including
    bracket means which is provided on one of the sides of said housing; and
    an elongated stanchion which can be attached to said bracket means to extend in a substantially vertical position adjacent to the front of a bumper on which the clamping device is engaged.

9. Apparatus for attaching to the bumper of a motor vehicle comprising
    a pair of clamping devices in accordance with claim 8;
    a first, rigid, extension arm extending between the housing of the first clamping device and the housing of the second clamping device;
    a second, rigid, extension arm extending between the stanchion attached to the housing of the first clamping device and the stanchion attached to the housing of the second clamping device, said second extension arm being attached to the respective stanchions at positions adjacent to the lower ends of the respective stanchion,
    whereby the rigid extensions arms maintain the clamping devices and the stanchions thereof in substantially parallel, spaced relationship.

10. Apparatus in accordance with claim 9, wherein each of the opposite ends of said first extension arm is pivotally attached to a mutually respective housing of said first and second clamping devices, and each of the opposite ends of said second extension arm is pivotally attached to a mutually respective stanchion.

11. Apparatus in accordance with claim 10, wherein each of the first and second extension arms is provided with a releasable elbow hinge, wherein the elbow hinge can be set to a locked state in which the respective extension arm is held in a rigid, linear position, and further wherein the elbow hinge can be released such that the respective extension arm can fold about the hinge, whereby the first and second extension arms can be folded so that the pair of clamping devices can be moved to storage position in which they lie in side-by-side relationship.

12. Apparatus in accordance with claim 9, wherein there is further provided a generally rectangular base platform whose length is such that the base platform can be positioned substantially horizontally between the stanchions of said clamping devices, with attachment means being provided at each of the opposite, longitudinal ends of said base platform for releasably attaching said base platform to the respective stanchions at selectable positions along the lengths of the respective stanchions.

13. Apparatus in accordance with claim 12, wherein
the stanchions are formed from elongate rectangular bar stock and a plurality of spaced openings are provided along the longitudinal length of the stanchion; and
said attachment means for releasably attaching said base platform to the respective stanchions comprises a pair of carriages secured at the opposite ends of said base platform, with the carriages being adapted to move laterally along the respective stanchions, said carriages further being provided with lock pins which are adapted to be releasably engaged in the openings in said stanchions.

14. Apparatus in accordance with claim 13, wherein there is further provided at least one extension platform which is attached to one of the ends of said base platform and extends outwardly therefrom in the same plane as said base platform.

15. Apparatus in accordance with claim 13, wherein stabilizing support means are provided for supporting said extension platform, with the stabilizing support means comprising
a second carriage which is adapted to move laterally along a respective stanchion;
lock means for securing the second carriage in first engagement with the respective stanchion at adjustable positions along the length of the respective stanchion; and
a support brace which extends from the second carriage to the extension platform at a position spaced from the end of said extension platform which is attached to said base platform.

16. Apparatus in accordance with claim 12, wherein there is further provided at least one extension platform which is attached to one of the ends of said base platform and extends outwardly therefrom in the same plane as said base platform.

17. Apparatus for attaching to a bumper of a motor vehicle comprising
a pair of clamp members which can be releasably secured to the bumper;
a pair of stanchions, with each stanchion being attached to a respective clamp member to extend in a substantially vertical position adjacent to the front of a bumper on which the clamp members are engaged; and
a generally rectangular base platform whose length is such that the base platform can be positioned substantially horizontally between the stanchions of said clamping devices, with attachment means being provided at each of the opposite, longitudinal ends of said base platform for releasably attaching said base platform to the respective stanchions at selectable positions along the lengths of the respective stanchions.

18. Apparatus in accordance with claim 17, wherein
the stanchions are formed from elongate rectangular bar stock and a plurality of spaced openings are provided along the longitudinal length of the stanchion; and
said attachment means for releasably attaching said base platform to the respective stanchions comprises a pair of carriages secured at the opposite ends of said base platform, with the carriages being adapted to move laterally along the respective stanchions, said carriages further being provided with lock pins which are adapted to be releasably engaged in the openings in said stanchions.

19. Apparatus in accordance with claim 18, wherein there is further provided at least one extension platform which is attached to one of the ends of said base platform and extends outwardly therefrom in the same plane as said base platform.

20. Apparatus in accordance with claim 18, wherein stabilizing support means are provided for supporting said extension platform, with the stabilizing support means comprising
a second carriage which is adapted to move laterally along a respective stanchion;
lock means for securing the second carriage in firm engagement with the respective stanchion at adjustable positions along the length of the respective stanchion; and
a support brace which extends from the second carriage to the extension platform at a position spaced from the end of said extension platform which is attached to said base platform.

* * * * *